United States Patent
Zhu et al.

(10) Patent No.: US 11,858,138 B2
(45) Date of Patent: Jan. 2, 2024

(54) METHOD FOR REALIZING DYNAMIC RUNNING GAIT OF BIPED ROBOT ON ROUGH TERRAIN ROAD

(71) Applicant: ZHEJIANG UNIVERSITY, Hangzhou (CN)

(72) Inventors: Qiuguo Zhu, Hangzhou (CN); Zunwang Ma, Hangzhou (CN); Bo Peng, Hangzhou (CN); Jun Wu, Hangzhou (CN); Rong Xiong, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 253 days.

(21) Appl. No.: 17/234,831

(22) Filed: Apr. 20, 2021

(65) Prior Publication Data
US 2021/0237265 A1 Aug. 5, 2021

Related U.S. Application Data

(63) Continuation of application No. PCT/CN2019/120770, filed on Nov. 26, 2019.

(51) Int. Cl.
*B25J 9/16* (2006.01)
*G05D 1/02* (2020.01)

(52) U.S. Cl.
CPC ............ *B25J 9/1602* (2013.01); *B25J 9/1633* (2013.01); *G05D 1/0223* (2013.01); *G05D 2201/0217* (2013.01)

(58) Field of Classification Search
CPC ...... B25J 9/1602; B25J 9/1633; B25J 9/0006; B25J 9/1664; G05D 1/0223; G05D 2201/0217; B62D 57/032; G05B 2219/40499; G05B 2219/39182; G05B 2219/39215
See application file for complete search history.

(56) References Cited

U.S. PATENT DOCUMENTS

2013/0079929 A1* 3/2013 Lim .................. B62D 57/032
700/250

FOREIGN PATENT DOCUMENTS

| CN | 102736628 A | 10/2012 |
|----|----|----|
| CN | 107065867 A | 8/2017 |
| CN | 110181541 A | 8/2019 |

OTHER PUBLICATIONS

International Search Report (PCT/CN2019/120770); dated Aug. 28, 2020.

(Continued)

*Primary Examiner* — Bao Long T Nguyen
(74) *Attorney, Agent, or Firm* — W&G Law Group

(57) ABSTRACT

The present disclosure provides a method for realizing a dynamic running gait of a biped robot on a rough terrain road, which sets a state machine for an entire running cycle to perform a balance control and movement trajectory planning of the robot in each state. At the time that the robot switches from the in-air phase into a landing phase, a SLIP model is used to control the posture balance and landing cushion; and when the robot is stable after landing, an LIP model is used to control a center of mass of the robot to a set height. An in-air phase of the robot in running is generated through movement trajectory planning and state switching of a supporting leg and a swinging leg to realize a running of the robot.

4 Claims, 6 Drawing Sheets

(56) References Cited

OTHER PUBLICATIONS

"Stable Walking Control and Strategy of Under-Actuated Biped Robot" (Zhu, Qiuguo et al.) [Oct. 31, 2017] pp. 18-24.
"Dynamic Multi-Domain Bipedal Walking with ATRIAS through SLIP based Human-Inspired Control" (Hereid, Ayonga et al.) [Apr. 30, 2014] pp. 263-272.

* cited by examiner

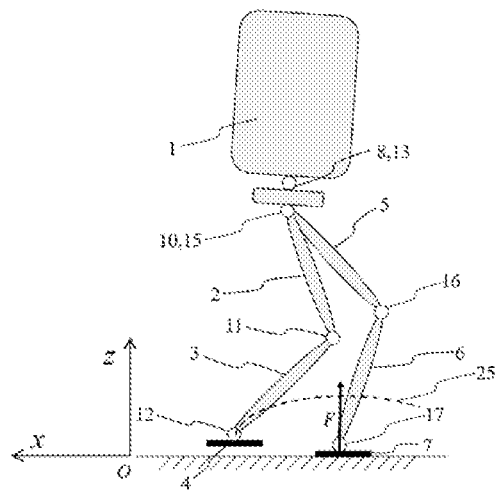

FIG. 6

| Simplifying a torso of the biped robot as a center of mass that concentrates all masses of a torso |
|---|

| Simplifying a leg of the biped robot as a linkage without mass and inertia that is retractable and connects the torso and a foot |
|---|

| Constraining the center of mass to move in a constrained plane |
|---|

Dividing, bases on whether a left leg and a right leg are in a state of a supporting phase, a phase state machine of the biped robot in a stable advancing process into one of a supporting phase of a left leg, a supporting phase of a right leg, an in-air phase of the left leg, and an in-air phase of the right leg, wherein stable and periodic switching of states form the running gait of the biped robot, where a balance control of the biped robot, a movement trajectory planning of a supporting leg and a movement trajectory planning of a swinging leg are performed in each of the supporting phase of the left leg, the supporting phase of the right leg, the in-air phase of the left leg, and the in-air phase of the right leg, and the balance control of the biped robot comprises a balance control of a body posture, a balance control of a height of the center of mass, and a control of an advancing speed of the biped robot; and where a balance control of a height of the center of mass is performed by controlling the height of the center of mass of the biped robot through controlling a force of ground, and the force is set by a following formula: $F_g = K_{pf}(h_{tar} - h) + K_{df}(-v_h) + Mg$

FIG. 7

METHOD FOR REALIZING DYNAMIC RUNNING GAIT OF BIPED ROBOT ON ROUGH TERRAIN ROAD

CROSS-REFERENCE TO RELATED APPLICATION

This application is a continuation of International Application No. PCT/CN2019/120770, filed on Nov. 26, 2019. The disclosures of the aforementioned application is hereby incorporated by reference in its entireties.

TECHNICAL FIELD

The disclosure relates to a robot control method, in particular to a method for realizing dynamic running of a biped robot on a rough terrain road.

BACKGROUND

Throughout the history of the development of human science and technology and civilization, human have been tirelessly exploring and researching various types of robots that can mimic human themselves and animals, and dreaming of realizing mimicking motion capabilities of human and animals by robots, even the intelligence. Currently, robots can be divided into wheel-tracked robots, leg-foot robots and torso robots according to driving modes. Leg-foot robots can adapt to complex road better than the wheel-tracked robots, and have unique advantages when running on rugged roads. As can be seen from the fact that human and other mammals can adapt to most natural landscape through their legs, leg-foot robots are more suitable for complex environments and have good flexibility and maneuverability. Human selects suitable footholds by visual information to cross different obstacles and adapt to different roads. Leg-foot robots also can adapt to most land environments by methods such as gait planning and balance controlling. Most animals in nature also adopt the leg-foot motion manner. Bipedal robots are shaped like human such that they have an unmatched advantage in affinity as compared to the wheel-tracked robot, and can better adapt and integrate into living and working environment of human. On the other hand, it is an inevitable trend to replace the working of humans in a high-risk environment or highly repetitive manual labor with humanoid robots in the future.

The dynamic running gait of the biped robot is an important challenge and one of research hot spots in the field of leg-foot robots. Compared with adopting a walking gait, the biped robot adopting a running gait can achieve a faster moving speed. Because the robot would have a forward speed due to inertia in the air phase, thus an advancing speed of the robot is no longer limited by a length of a linkage of the robot, so that the robot has an improvement of greater speed. The robot switches from walking to running, which further bring the performance of joint motors of the robot into full play, thereby greatly improving motion flexibility of the robot. Correspondingly, the robot adopting the running gait has a higher requirement on the dynamic balance of the robot, the robot is required to quickly adjust a control strategy when switching between the air phase and the support phase, and to apply a precise control action such that the robot maintains a desired motion speed and steady state.

In general, there are still only a handful of robots that can achieve the running gait in the world, among which three types of robots, ASIMO, ATLAS and ATRIAS robots are the representative. The ASIMO robot is the representative biped robot in Asia. This robot was launched by Honda in Japan in 2000. After more than ten years of improvement, the ASIMO robot now not only has abilities of sight and hearing, but also has abilities of avoiding obstacles and going up and down stairs. The ASIMO robot is about 130 cm tall and weighs about 48 kg, and its body has a total of 30 degrees of freedom. The latest generation of ASIMO robot can run forward at a speed of 9 km/h, and the duration of both legs in the in-air phase lasts about 50 ms. At the same time, the ASIMO can jump continuously with one foot, jump continuously with both feet, and change a direction while jumping. However, the biped robot like the ASIMO robot uses the Zero Moment Point (ZMP) stability criterion, and uses a large foot design in its mechanical structure. The used control strategy and mechanical structure design make the ASIMO have a limited adaptability to complex roads. The ZMP stability criterion cannot be applied to a foot under-actuated robot, and is too strict for biped walking, running and jumping. At present, it can only adapt to the environment of flat indoor roads, but cannot form a stable running gait on rough outdoor roads.

The ATRIAS robot jointly launched by Oregon State University, the University of Michigan and Carnegie Mellon University has capabilities of outdoor walking and running and a maximum speed up to 9 km/h, and can achieve a stable running gait at a speed of 5 km/h. The ATRIAS can run fast on grass or a rough terrain road, and can adapt to the ground with a certain slope. The legs of the ATRIAS each have a four-linkage structure and motor-driven joints to concentrate most of the robot's weight above the hip. This design mimics poultry and birds in nature having the fastest biped-running speed, thereby expecting to obtain a higher running speed. Each leg of the ATRIAS has three degrees of freedom and includes a pitch joint of a hip joint, a deflection joint of a hip joint, and a knee joint. The ATRIAS cannot achieve an autonomous control of directions due to lack of a yaw joint of a hip joint. It can be seen from the papers published by the ATRIAS team that an overall mechanism design of ATRIAS well fits the used spring loaded inverted pendulum (SLIP) model, that is, most mass is concentrated in the hip, while the leg mass is designed to be very light. These structural characteristics enables that a combined force of the hip joint and the knee joint generates a force of the ATRIAS when taking off, thus the ATRIAS has a larger thrust-to-weight ratio of legs to the trunk, and the light legs have less disturbance to the posture balance when swinging fast. The SLIP model is similar to the linear inverted pendulum (LIP) model, and their difference therebetween lies in that height of the center of mass of the LIP model is a constant value, while in the SLIP model, a supporting leg has a compressing process when landing and a stretching process when taking-off during a gait cycle of the robot, and the center of mass has a certain degree of volatility, and there is a high requirement on the torque output of the knee joint of the supporting leg, so the control algorithm may not be suitable for most biped robots, especially motor-driven biped robots.

Atlas robot is a biped robot developed by Boston Dynamics. The Atlas robot has vision and grasping capabilities, can achieve functions such as carrying, climbing etc., and can also achieve walking in the snow. It can be seen from the latest test video released by Boston Dynamics that the Atlas robot is already able to run quickly, get over larger obstacles, and even achieve flexible movements such as a backflip, triple jump and floor exercises. The Atlas also has extremely high stability in terms of balance. It not only can walk on rugged roads, but also can continue to maintain balance after the body is vigorously pushed by an external force. It is currently recognized as the most powerful biped robot in the world. The Atlas uses a hydraulic device to drive the joint torque. Compared with the motor, the hydraulic device can output more power and is not sensitive to the weight of the robot. However, the hydraulic pressure still has disadvantages such as instability and complicated control. Therefore, most researchers still prefer to use the motor to dive the biped robot. At the same time, Boston Dynamics has not yet publish a control algorithm for the Atlas robot, and other biped robot platforms can not directly refer to and learn experience of the Atlas robot in running gait.

SUMMARY

In view of the above problems, the present disclosure proposes a method for realizing dynamic running of a biped robot on an indoor or outdoor road. At the same time, an air phase of a robot in running is generated by trajectory planning and state switching of a supporting leg and a swinging leg, thereby realizing a running movement of the robot, increasing a moving speed of the robot, and improving a dynamic balance performance of the robot in running. The present disclosure has a certain universality on common biped robots or humanoid robot platforms, and also has good adaptability for an outdoor rough terrain road.

An object of the present disclosure is achieved by the following technical solution. A method for realizing a dynamic running gait of a biped robot on a rough terrain road sets a phase state machine of the robot to realize movement planning and controlling in each state, and performing a balance control and movement trajectory planning of the biped robot in each state. At the time that the robot switches from the in-air phase into a landing phase, a SLIP model is used to control the posture balance and landing cushion; and when the robot is stable after landing, an LIP model is used to control a center of mass of the robot to a set height. The running gait of the biped robot is realized by methods for landing control and supporting phase control, the corresponding posture control, height control and speed control, as well as the movement trajectory planning of the supporting leg and the swinging leg.

Further, in this method, during advancement of the robot, a torso of the robot is simplified to a center of mass that concentrates all masses; a leg of the robot are simplified as a linkage without mass and inertia that is retractable and connects the torso and a feet; and the center of mass is constrained to move in a constrained plane. A state machine is designed such that the biped robot constantly and stably switches between individual states of the state machine, achieving the balance control of the biped robot in each stale of the robot. The state machine of the biped robot in a stable advancing process is dived, bases on whether a left leg and a right leg are in a state of the supporting phase, into one of a supporting phase of the left leg, a supporting phase of the right leg, an in-air phase of the left leg, and an in-air phase of the right leg. The stable and periodic switching of states form the running gait of the biped robot, and a balance control and movement trajectory planning of the biped robot are performed in each state, a corresponding controller is provided to achieve the balance control of the robot and the movement control of the swinging leg. The balance control of the biped robot includes a balance control of a body posture, a balance control of a height of the center of mass, and a control of an advancing speed of the robot. The balance control of the height of the center of mass, i.e., controlling the center of mass of the body of the robot to move in a constrained plane parallel to ground, is performed by controlling the height of the center of mass of the robot through controlling a force of ground, and the force is set by a following formula:

$$F_z = K_{pf}(h_{set} - h) + K_{df}(-v_h) + Mg,$$

where $h_{set}$ denotes a set height of the center of mass; h denotes an actual height of the center of mass; $v_h$ denotes a velocity of the center of mass in an upright direction; $K_{pf}$ and $K_{df}$ denote coefficients to be determined; M denotes a weight of the center of mass of the robot; and g denotes an acceleration of gravity.

Further, in the balance control of the body posture of the robot, a PD control is introduced to maintain the posture angle of the body trunk of the robot to be near a stable range. The formula for the balance control of the body posture is as follows:

$$\tau_h = K_p(q_d - q) + K_d(\dot{q}_d - \dot{q}) + \tau_f,$$

Where $\tau_h$ denotes a balance torque of the torso; $q_d$ denotes a desired body posture angle; q denotes a body posture angle; $\dot{q}_d$ denotes a desired body posture angular velocity; $\dot{q}$ denotes a body posture angular velocity; $K_p$ and $K_d$ respectively denote corresponding feedback coefficient matrices to be determined that are related to an actual biped robot platform; and $\tau_f$ denotes a feedforward torque generated by the gravity of the center of mass acting on a hip joint of the supporting leg.

Further, the control of the advancing speed of the robot includes controlling a speed of the center of mass of the robot to approach a desired speed or maintain stable at a desired speed by a foothold of the biped robot, and a coordinate of the foothold is obtained by a formula:

$$L_f = K_{0v} + K_{pv}v + K_{dv}(v - v_d),$$

where $L_f$ denotes the coordinate of the foothold; v denotes the speed of the robot; $v_d$ denotes the desired speed; $K_{0v}$, $K_{pv}$, and $K_{dv}$ all denote coefficient matrices to be determined that are related to the duration of the supporting phase of the single leg and the height of the center of mass of the biped robot.

Further, the movement trajectory planning of the supporting leg and the movement trajectory planning of the swinging leg use phase information planning to perform contraction of the supporting leg and stretching of the swinging leg; and wherein at a moment when the supporting phase of a single leg of the biped robot is to be ended, the state is switched into in-air phase of both legs, the phase information is set to be zero, the supporting leg is interchangeable with the swinging leg, and a control program of the biped robot controls movements of the supporting leg and the swinging leg to achieve the in-air phase of the biped robot, and formulas of swinging trajectory of both legs in the in-air phase are as follows:

$$x_{sw} = \begin{cases} x_s & p \leq \Delta p \\ f_{swx}(x_s, x_f, p, T) & p > \Delta p \end{cases},$$

$$z_{sw} = \begin{cases} \Delta h \frac{p}{\Delta p} + z_s\left(1 - \frac{p}{\Delta p}\right) & p \leq \Delta p \\ f_{swz}(\Delta h, z_f, p, T) & p > \Delta p \end{cases}, \text{ and}$$

$$z_{su} = z_{sus}\frac{p}{\Delta p} + z_{suf}\left(1 - \frac{p}{\Delta p}\right) \quad p \leq \Delta p,$$

where $x_{sw}$ and $z_{sw}$ denote coordinates of an end point of the swinging leg; $z_{su}$ denotes an ordinate of an end point of the supporting leg; $x_s$ and $z_s$ denote initial coordinates of the end point of the swinging leg; $x_f$ and $z_f$ denote set coordinates of the end point of the swinging leg; $\Delta h$ denotes a set lifting height of a leg; p denotes set phase information that is positively correlated with an execution time for current gait, and $\Delta p$ denotes a set phase duration of the in-air phase; T denotes a stride cycle; $f_{swx}(x_s, x_f, p, T)$ and $f_{swz}(\Delta h, z_f, p, T)$ denote planning curves of the swinging leg; $z_{sus}$ and $z_{suf}$ respectively denote a starting ordinate and a set ordinate of the end point of the supporting leg. A state in which both legs are in air occurs during the swinging leg lifts while the supporting leg has not fallen to the ground, so as to achieve the running gait of the biped robot.

The beneficial effects of the present disclosure are as follows: the present disclosure proposes a method for realizing a dynamic running gait of a biped robot on a rough terrain road, in which, at the time that the robot changes from the air phase to the landing phase, the SLIP model is used to control the posture balance and ground cushioning; after the robot is stable on the ground, the LIP model is used to control the center of mass of the robot to a set height, so as to realize the dynamic balance control and trajectory movement planning of the biped robot, and thus realize the running gait of the biped robot. At present, most biped robots adopt the LIP model and ZMP stability criterion to realize the walking gait of the biped robot, the adopted large-foot design has a great limitation on the movement capability of the biped robot. However, this method avoids the limitation of adopting the ZMP stability criterion, successfully achieves a stable running gait of the biped robot, and adopts a small-foot design to achieve dynamic balance and stability, so that the biped robot has abilities of stably running and walking on the rough terrain road. Compared with the ATRIAS robot using the SLIP model, this method uses the SLIP model to control at the moment of landing, and also has the ground cushioning effect reached by ATRIAS, thereby reducing the damage to the mechanical mechanism of the robot body by the impact force of the ground. Further, after the robot is stable on the ground, the center of mass is controlled to the set height, instead of pushing the center of mass to a certain height to generate the air phase as required by the SLIP model. The air phase of this method is generated by the rapid switching state of the current supporting legs, thus lowering output torque requirements for the knee joints of the robot. This method is also applicable to robots whose joint performance is constrained by motor capability. Finally, using the SLIP model requires more accurate state estimation, and when the supporting leg begin to stretch and then take off, the center of mass of the robot will generate a velocity upward from the ground. Further, it requires an accurate estimation of the take-off speed and the posture of the center of mass of the biped robot, and thus has a high accuracy of the sensor and algorithm requirement, which increases the development cost of the biped robot. In comparison, compared with the LIP model or the SLIP model, the control strategy used this method greatly reduces the requirements for the mechanical structure design and joint performance of the biped robot, and can better meet the requirements of most robots with limited performances to perform running gait development and experiments, thereby having a better flexibility and versatility, further shortening the development cycle and reducing development costs.

BRIEF DESCRIPTION OF DRAWINGS

FIG. 6 is a single-leg supporting phase of a left leg of a biped robot; and FIG. 7 is a schematic diagram of a method for realizing a dynamic running gait of a biped robot on a rough terrain road.

Figure 1:
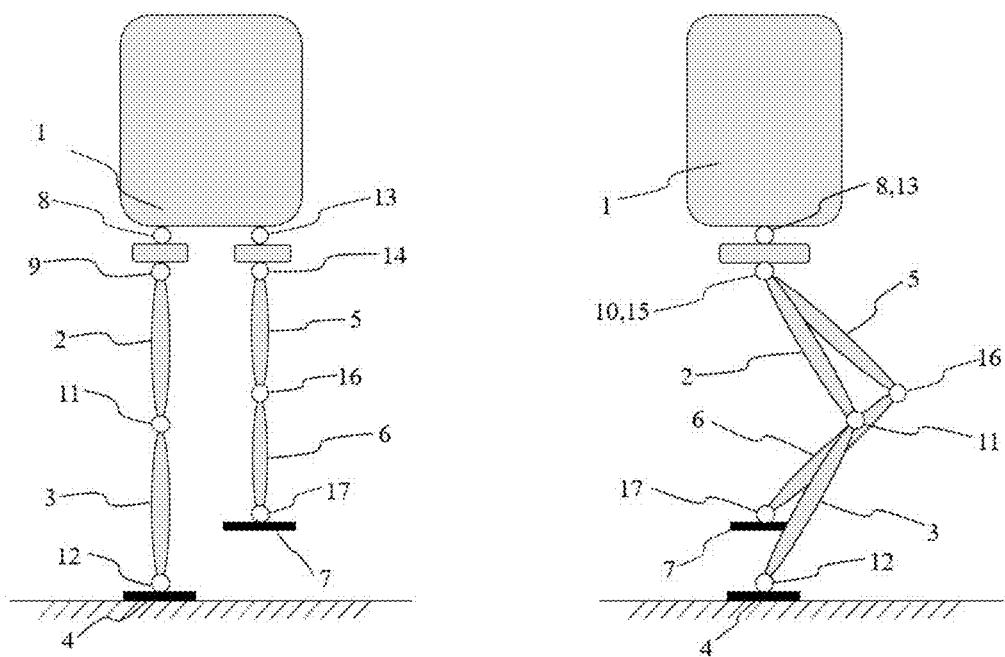
FIG. 1 is an overall model diagram of a biped robot, in which (a) is a front view and (b) is a side view.

In the drawings, 1. trunk, 2. right thigh linkage, 3. right calf linkage, 4. right foot, 5. left thigh linkage, 6. left calf linkage, 7. left foot, 8. right hip yaw joint, 9. right hip swinging joint, 10. right hip pitch joint, 11. right leg knee joint, 12. right leg ankle joint, 13. left hip yaw joint, 14. left hip swinging joint, 15. left hip pitch joint, 16. left leg knee joint, 17. left leg ankle joint, 18. initial standing state, 19. supporting phase of left single leg, 20. in-air phase of left leg, 21. single leg supporting phase of right leg, 22. single leg supporting phase of right leg, 22. in-air phase of right leg, 23. equivalent linkage, 24. equivalent center of mass, 25. movement trajectory of swinging leg.

DESCRIPTION OF EMBODIMENTS

The present disclosure will be further described below with reference to the drawings and examples.

The present disclosure proposes a method for realizing a dynamic running gait of a biped robot on a rough terrain road, is the method constructs a hybrid inverted pendulum (HIP) model for controlling a dynamic running of the biped robot on the rough terrain road, and the HIP model is a combination of a linear inverted pendulum and a spring loaded inverted pendulum phase, in order to further explain the method. The HIP model refers to a model in which a torso of the robot is simplifies as a center of mass that concentrates all masses, a leg of the robot is simplified to a retractable linkage without mass and inertia that connects the torso and a foot, and the center of mass is constrained to move in a constrained plane. When the robot changes from an in-air phase to a landing phase, there is a large impact force between the robot and the ground. The adopted HIP model shows characteristics of the SLIP model, and the center of mass is compressed to cushion the impact force of the ground. When the robot is stable on the ground, the HIP model shows characteristics of the LIP model, and the center of mass of the robot is controlled to a set height. A state machine of the biped robot refers to dividing a stable advancing process of the robot into four states according to whether the left leg and right leg are in a supporting phase, namely a supporting phase of the left leg, an in-air phase of the left leg, a supporting phase of the right leg, and an in-air phase of the right leg. A stable and periodic switching of the state machine forms a running gait of the biped robot, and a corresponding controller is set in each state to realize a balance control of the robot and a motion control of the swinging leg.

As shown in FIGS. 1-7, the method for realizing the running gait of the biped robot according to the present disclosure includes adopting the HIP model to realize the balance control of the biped robot and using movement trajectory planning of the supporting leg and the swinging leg to realize the running gait of the biped robot. The structure of the biped robot is shown in FIG. 1, and the biped robot includes a torso 1 and lower limbs. The lower limbs include a right thigh linkage 2, a right calf linkage 3, a right foot 4, a left thigh linkage 5, a left calf linkage 6, a left foot 7, a right hip yaw joint 8, a right hip swinging joint 9, a right hip pitch joint 10, a right leg knee joint 11, a right ankle joint 12, a left hip yaw joint 13, a left hip swinging joint 14, a left hip pitch joint 15, a left leg knee joint 16, and a left leg ankle joint 17. The torso 1 is equipped with an inertial measurement unit configured to measure posture information of the body, and the left foot 7 and the right foot 4 each are equipped with a force sensor configured to measure a contact force between the foot and the ground. The control method is described in detail below.

Figure 2:
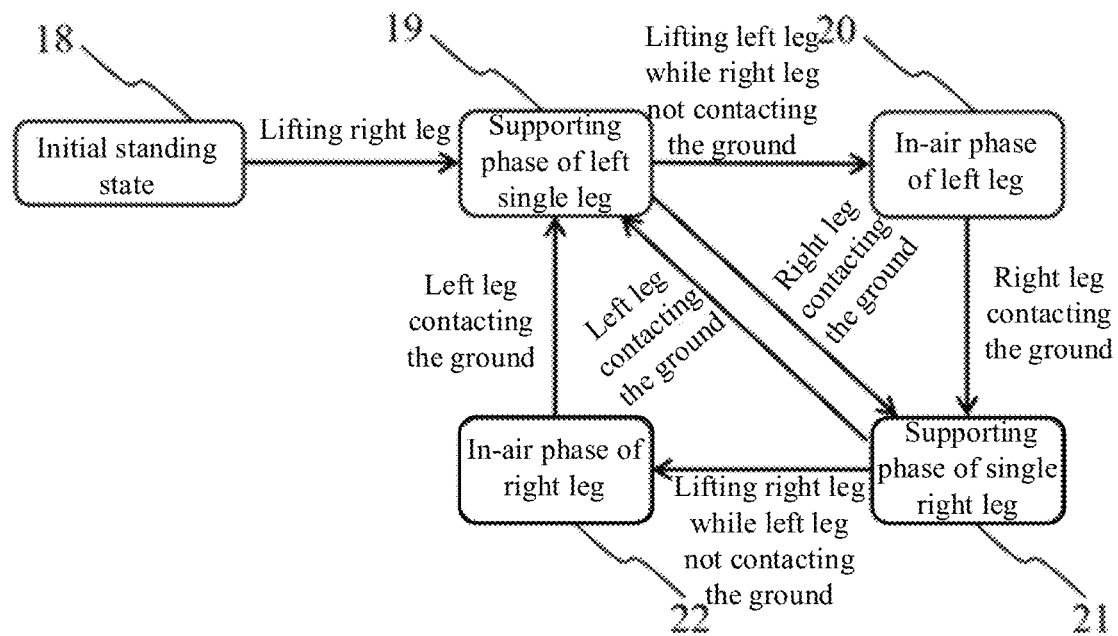
FIG. 2 is a switching diagram of a state machine of a biped robot.
Figure 3:
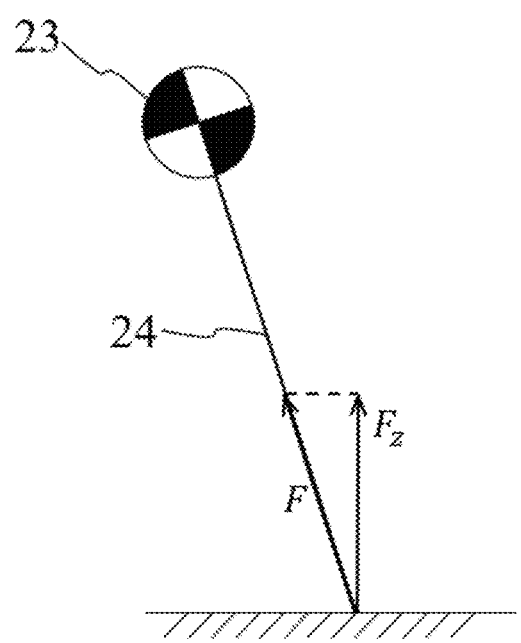
FIG. 3 is a schematic diagram of a HIP model.

The HIP model is shown in FIG. 3, the torso 1 of the robot is simplified as a center of mass 24 that concentrates all masses, the legs of the robot is simplified as a retractable linkage 23 without mass and inertia that connects the torso and the feet, and the center of mass is constrained to move in a constrained plane. The state machine of the biped robot refers to dividing the stable advancing process of the robot into four states according to whether the left and right legs are in the supporting phase, namely a supporting phase 19 of the left leg, an in-air phase 20 of the left leg, a supporting phase 21 of the right leg, and an in-air phase 22 of the right leg, which are as shown in FIG. 2. The biped robot starts to jump into a loop of the state machine from an initial standing state 18, and sets a corresponding controller in the corresponding state to achieve the balance of the torso of the body and the movement planning of the swinging leg. The state machine has a unique jumping direction, and a stable and periodic switching of the state machine forms the stable advancing process of the biped robot. The balance control of the biped robot includes a balance control of the body posture, a balance control of the height of the center of mass, and a control of an advancing speed of the robot. This method avoids the limitations of adopting the ZMP stability criterion, and successfully achieves a stable running gait of the biped robot. The use of small feet can achieve dynamic balance and stability, so that the biped robot can achieve capabilities of stably running and walking of the robot on the rough terrain road.

The balance control of the body posture, namely controlling the posture angle of the torso of the robot body to be maintained near a stable range, during the single-leg supporting phase of the biped robot, adopts a classic body posture balance control strategy, and uses PD control to achieve the balance of the torso 1. The specific posture balance control formula is as follows:

$$\tau_h = K_p(q_d - q) + K_d(\dot{q}_d - \dot{q}) + \tau_f,$$

where $\tau_h$ denotes a balance torque of the torso; $q_d$ denotes a desired body posture angle; q denotes a body posture angle; $\dot{q}_d$ denotes a desired body posture angular velocity; $\dot{q}$ denotes a body posture angular velocity; $K_p$ and $K_d$ respectively denote corresponding feedback coefficient matrices to be determined that are related to the actual biped robot platform; $\tau_f$ denotes a feedforward torque generated by a gravity of the center of mass applied on a hip joint of the supporting leg. $\tau_h$ denotes a balance torque of the torso; $q_d$ denotes a desired body posture angle; q denotes a body posture angle; $\dot{q}_d$ denotes a desired body posture angular velocity; $\dot{q}$ denotes a body posture angular velocity; $K_p$ and $K_d$ respectively denote corresponding feedback coefficient matrices to be determined that are related to the actual biped robot platform; $\tau_f$ denotes a feedforward torque generated by a gravity of the center of mass applied on a hip joint of the supporting leg; and the hip joint of the supporting leg is used to generate $\tau_f$ to achieve the balance of the torso of the robot.

The balance control of the height of center of mass, namely controlling the center of mass of the robot to move in a constrained plane parallel to the ground, based on the theory of the LIP model, achieves the balance of the height of the center of mass of the body by controlling the force supplied by the ground. As shown in FIG. 3, the balance control of the height of the center of mass is achieved by controlling $F_z$, which is set as the following formula:

$$F_z = K_{pf}(h_{set} - h) + K_{df}(-v_h) + Mg,$$

where $h_{set}$ denotes a set height of the center of mass; h denotes an actual height of the center of mass; $v_h$ denotes a velocity of the center of mass in an upright direction; $K_{pf}$ and $K_{df}$ denote coefficients to be determined; M denotes a weight of the center of mass of the robot; and g denotes an acceleration of gravity. Through this formula, the center of mass of the robot is always stable at the set height.

The control of advancing speed of the robot refers to controlling the speed of the center of mass of the biped robot to approach a desired speed or maintain stable at the desired speed by the foothold of the biped robot, and controlling the robot speed by coordinates of the foothold, namely a step length in the advancing direction of the robot. The formula of specific coordinate of the foothold is as follows:

$$L_f = K_{0v} + K_{pv}v + K_{dv}(v - v_d),$$

where $L_f$ denotes the coordinate of the foothold; v denotes a speed of the robot; $v_d$ denotes the desired speed; $K_{0v}$, $K_{pv}$, and $K_{dv}$ all denote coefficient matrices to be determined that are related to a time for supporting phase of a single leg and the height of the center of mass. The coordinate of the foothold is set as a coordinate of an end point of the swinging leg swinging in a gait cycle, so as to realize the control of speed of the center of mass by the foothold.

Figure 4:
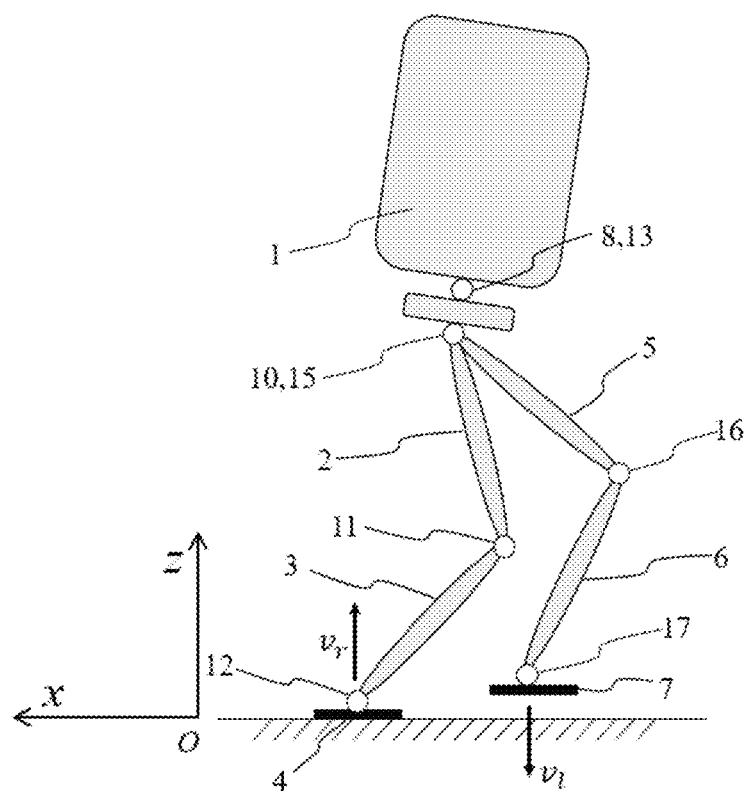
FIG. 4 is a single-leg supporting phase of a right leg of a biped robot.
Figure 5:
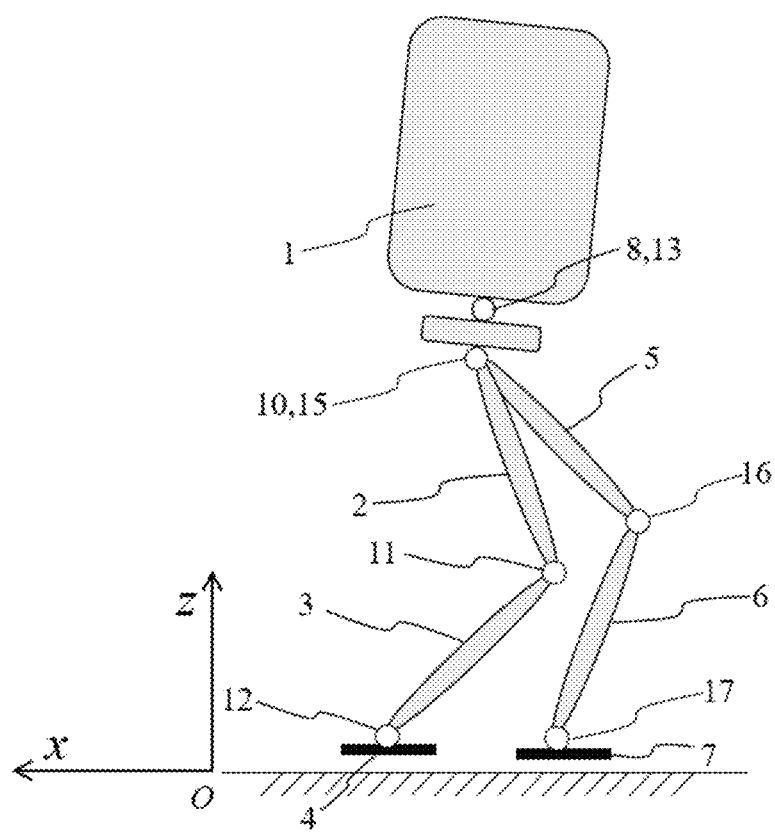
FIG. 5 is an in-air phase of a right leg of a biped robot.

The movement trajectory planning of the supporting leg and the movement trajectory planning of swinging leg refers to using information planning to perform a contraction of the supporting leg and a stretching of the swinging leg to realize the in-air phase of both legs of the biped robot. Taking a case in which the supporting phase of single right leg is switched into the supporting phase of single left leg as an example, as shown in FIG. 4, a moment when the supporting phase of a single leg of the biped robot is to be ended is defined as the beginning of a gait cycle, the phase information is set to be zero, the supporting leg is interchangeable with the swinging leg so that the right leg becomes the swinging leg and the left leg becomes the supporting leg. The control program of the biped robot controls the movement of the supporting leg and the swinging leg to achieve air phase of the biped robot. The formula of the swinging trajectory of both legs of the robot is as follows:

$$x_{sw} = \begin{cases} x_s & p \leq \Delta p \\ f_{swx}(x_s, x_f, p, T) & p > \Delta p \end{cases},$$

$$z_{sw} = \begin{cases} \Delta h \frac{p}{\Delta p} + z_s\left(1 - \frac{p}{\Delta p}\right) & p \leq \Delta p \\ f_{swz}(\Delta h, z_f, p, T) & p > \Delta p \end{cases}, \text{ and}$$

$$z_{su} = z_{sus}\frac{p}{\Delta p} + z_{suf}\left(1 - \frac{p}{\Delta p}\right) \quad p \leq \Delta p,$$

where $x_{sw}$ and $z_{sw}$ denote coordinates of an end point of the swinging leg; $z_{su}$ denotes an ordinate of an end point of the supporting leg; $x_s$ and $z_s$ denote initial coordinates of the end point of the swinging leg; $x_f$ and $z_f$ denote set coordinates of the end point of the swinging leg; $\Delta h$ denotes a set lifting height of a leg; p denotes set phase information that is positively correlated with an execution time for current gait, and $\Delta p$ denotes a set phase duration of the in-air phase; T denotes a stride cycle; $f_{swx}(x_s, x_f, p, T)$ and $f_{swz}(\Delta h, z_f, p, T)$ denote planning curves of the swinging leg; and $z_{sus}$ and $z_{suf}$ respectively denote a starting ordinate and a set ordinate of the end point of the supporting leg. According to the swinging trajectory of both legs of the robot, the robot controls the supporting leg to move downwards at the beginning of one gait cycle, and controls the swinging leg to lift upward. When the upward contraction speed of the swinging leg is greater than the vertical downward component of the velocity of the center of mass, the end of the supporting leg generates a downward speed while the end of the swinging leg generates an upward speed. When the contraction speed of the swinging leg of the robot is faster, the swinging leg has been lifted, while the supporting leg has not yet fallen to the ground, so that the robot is in a state in which its both feet are in the air, which is shown in FIG. 5. The air phase of this method is generated by the rapid switching state of the current supporting leg, thus reducing the output torque requirements of the robot knee joints. This method is also applicable to those robots whose joint performance is constrained by motor capabilities. When the robot is in the in-air phase of both legs, the influence of air resistance can be ignored, the center of mass of the robot would maintain the current movement, and the robot would continue to maintain its advancing speed in the forward direction. When the supporting leg touches the ground or the phase information $p > \Delta p$ is satisfied, the robot switches the state machine from the in-air phase of both legs into the supporting phase of a single leg, which is shown in FIG. 6. At the same time, the control program will control the swinging leg to move according to the set swinging trajectory 25, which is determined by $f_{swx}(x_s, x_f, p, T)$, $f_{swz}(\Delta h, z_f, p, T)$, and the above method is used to implement the corresponding control strategy for the supporting leg of the biped robot based on the HIP model. This cycle reciprocates to form stable running gaits of the biped robot. In general, compared with the LIP model or the SLIP model, the control strategy based on the HIP model greatly reduces the requirements for the mechanical structure design and joint performance of the biped robot. The control algorithm can be applied to most biped robots, especially those motor-driven biped robots, and has better flexibility and versatility.

What is claimed is:

1. A method for realizing a dynamic running gait of a biped robot on a rough terrain road, comprising:
   simplifying a torso of the biped robot as a center of mass that concentrates all masses of a torso;
   simplifying a leg of the biped robot as a linkage without mass and inertia that is retractable and connects the torso and a foot;
   constraining the center of mass to move in a constrained plane; and
   dividing, bases on whether a left leg and a right leg are in a state of a supporting phase, a phase state machine of the biped robot in a stable advancing process into one of a supporting phase of a left leg, a supporting phase of a right leg, an in-air phase of the left leg, and an in-air phase of the right leg, wherein stable and periodic switching of states form the running gait of the biped robot;
   wherein a balance control of the biped robot, a movement trajectory planning of a supporting leg and a movement trajectory planning of a swinging leg are performed in each of the supporting phase of the left leg, the supporting phase of the right leg, the in-air phase of the left leg, and the in-air phase of the right leg, and the balance control of the biped robot comprises a balance control of a body posture, a balance control of a height of the center of mass, and a control of an advancing speed of the biped robot; and
   wherein a balance control of a height of the center of mass is performed by controlling the height of the center of mass of the biped robot through controlling a force of ground, and the force is set by a following formula:

$$F_z = K_{pf}(h_{set} - h) + K_{df}(-v_h) + Mg,$$

where $h_{set}$ denotes a set height of the center of mass; h denotes an actual height of the center of mass; $v_h$ denotes a velocity of the center of mass in an upright direction; $K_{pf}$ and $K_{df}$ denote a proportion coefficient and a differentiation coefficient; M denotes a weight of the center of mass of the biped robot; and g denotes an acceleration of gravity.

2. The method for realizing the dynamic running gait of the biped robot on the rough terrain road according to claim 1, wherein in the balance control of the body posture of the robot, a PD control is introduced to maintain the posture angle of a body trunk of the biped robot to be near a stable range, the balance control of the body posture is set as follows:

$$\tau_h = K_p(q_d - q) + K_d(\dot{q}_d - \dot{q}) + \tau_f,$$

where $\tau_h$ denotes a balance torque of the torso; $q_d$ denotes a desired body posture angle; q denotes a body posture angle; $\dot{q}_d$ denotes a desired body posture angular velocity; $\dot{q}$ denotes a body posture angular velocity; $K_p$ and $K_d$ respectively denote corresponding feedback coefficient matrices that are related to an actual biped robot platform, and respectively denote a proportion coefficient and a differentiation coefficient; and $\tau_f$ denotes a feedforward torque generated by a gravity of the center of mass applied on a hip joint of the supporting leg.

3. The method for realizing the dynamic running gait of the biped robot on the rough terrain road according to claim 1, wherein the control of the advancing speed of the biped robot comprises controlling a speed of the center of mass of the biped robot to approach a desired speed or maintain stable at a desired speed by a foothold of the biped robot, and a coordinate of the foothold is obtained by a formula:

$$L_f = K_{0v} + K_{pv}v + K_{dv}(v - v_d),$$

where $L_f$ denotes the coordinate of the foothold; v denotes a speed of the biped robot; $v_d$ denotes the desired speed; $K_{0v}$, $K_{pv}$, and $K_{dv}$ all denote coefficient matrices that are related to a time for supporting phase of a single leg and the height of the center of mass of the biped robot, and $K_{0v}$, $K_{pv}$, and $K_{dv}$ and also respectively denote a constant, a proportion coefficient, and a differentiation coefficient.

4. The method for realizing the dynamic running gait of the biped robot on a the rough terrain road according to claim 1, wherein the movement trajectory planning of the supporting leg and the movement trajectory planning of the swinging leg use phase information planning to perform contraction of the supporting leg and stretching of the swinging leg; and wherein at a moment when the supporting phase of a single leg of the biped robot is to be ended, the state is switched into in-air phase of both legs, the phase information is set to be zero, the supporting leg is interchangeable with the swinging leg, and a control program of the biped robot controls movements of the supporting leg and the swinging leg to achieve the in-air phase of the biped robot, and formulas of swinging trajectory of both legs in the in-air phase are as follows:

$$x_{sw} = \begin{cases} x_s & p \leq \Delta p \\ f_{swx}(x_s, x_f, p, T) & p > \Delta p \end{cases},$$

$$z_{sw} = \begin{cases} \Delta h \frac{p}{\Delta p} + z_s \left(1 - \frac{p}{\Delta p}\right) & p \leq \Delta p \\ f_{swz}(\Delta h, z_f, p, T) & p > \Delta p \end{cases}, \text{ and}$$

$$z_{su} = z_{sus} \frac{p}{\Delta p} + z_{suf} \left(1 - \frac{p}{\Delta p}\right) \quad p \leq \Delta p,$$

where $x_{sw}$ and $z_{sw}$ denote coordinates of an end point of the swinging leg; $z_{su}$ denotes an ordinate of an end point of the supporting leg; $x_s$ and $z_s$ denote initial coordinates of the end point of the swinging leg; $x_f$ and $z_f$ denote set coordinates of the end point of the swinging leg; $\Delta h$ denotes a set lifting height of a leg; p denotes set phase information that is positively correlated with an execution time for current gait, and $\Delta p$ denotes a set phase duration of the in-air phase; T denotes a stride cycle; $f_{swx}(x_s, x_f, p, T)$ and $f_{swz}(\Delta h, z_f, p, T)$ denote planning curves of the swinging leg; $z_{sus}$ and $z_{suf}$ respectively denote a starting ordinate and a set ordinate of the end point of the supporting leg; and wherein a state in which both legs are in air occurs during the swinging leg lifts while the supporting leg has not fallen onto the ground, so as to achieve the running gait of the biped robot.

\* \* \* \* \*